Figure 1:
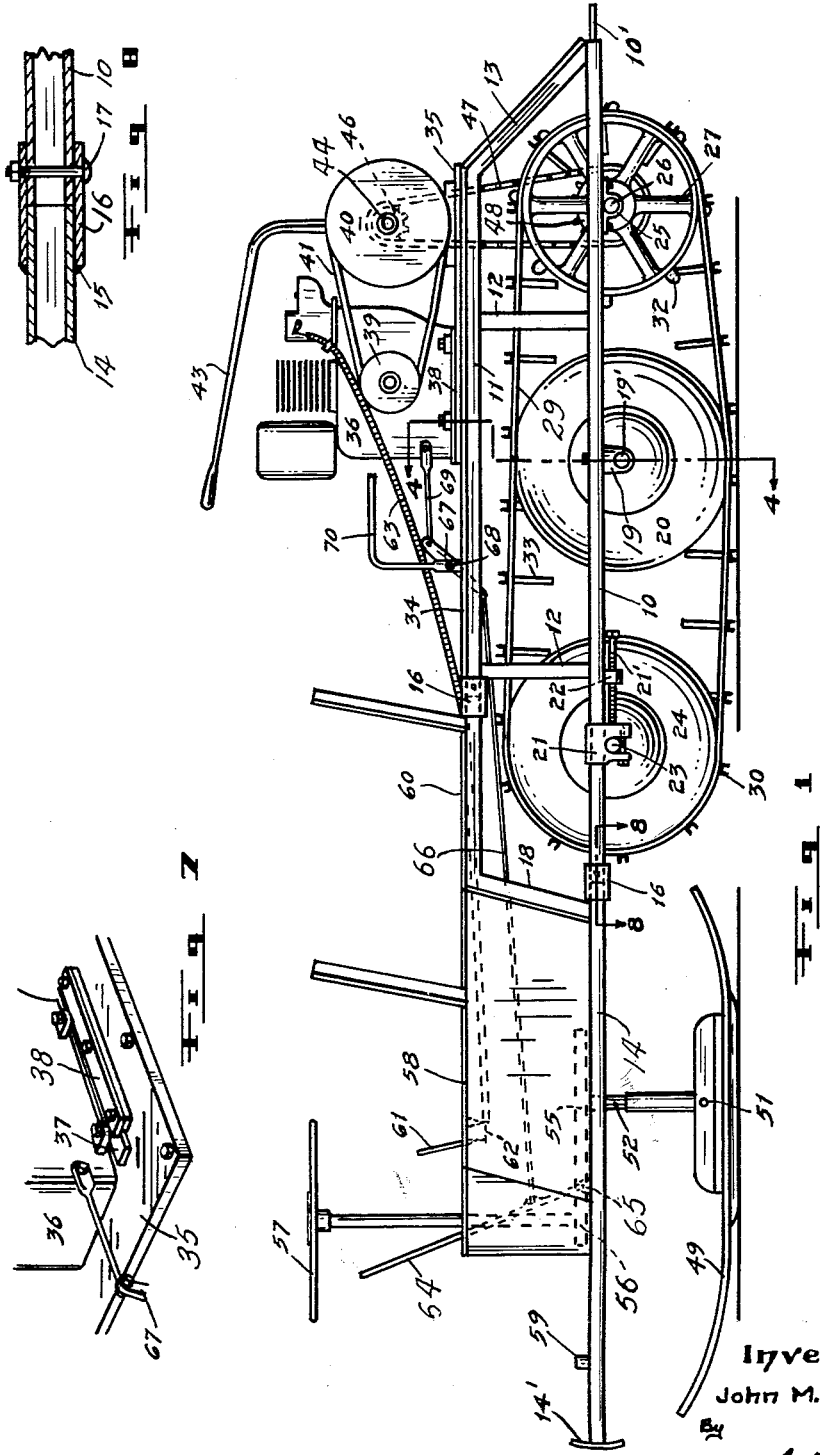

Dec. 5, 1961 J. M. HOWES 3,011,576
ENDLESS TREAD CONSTRUCTION FOR A SNOWMOBILE
Filed Sept. 24, 1958 4 Sheets-Sheet 1

Inventor
John M. Howes
By
Walter L. Boggess
AGENT

Dec. 5, 1961 J. M. HOWES 3,011,576
ENDLESS TREAD CONSTRUCTION FOR A SNOWMOBILE
Filed Sept. 24, 1958 4 Sheets-Sheet 2

Inventor
John M. Howes
By
*Walter R. Boggins*
AGENT

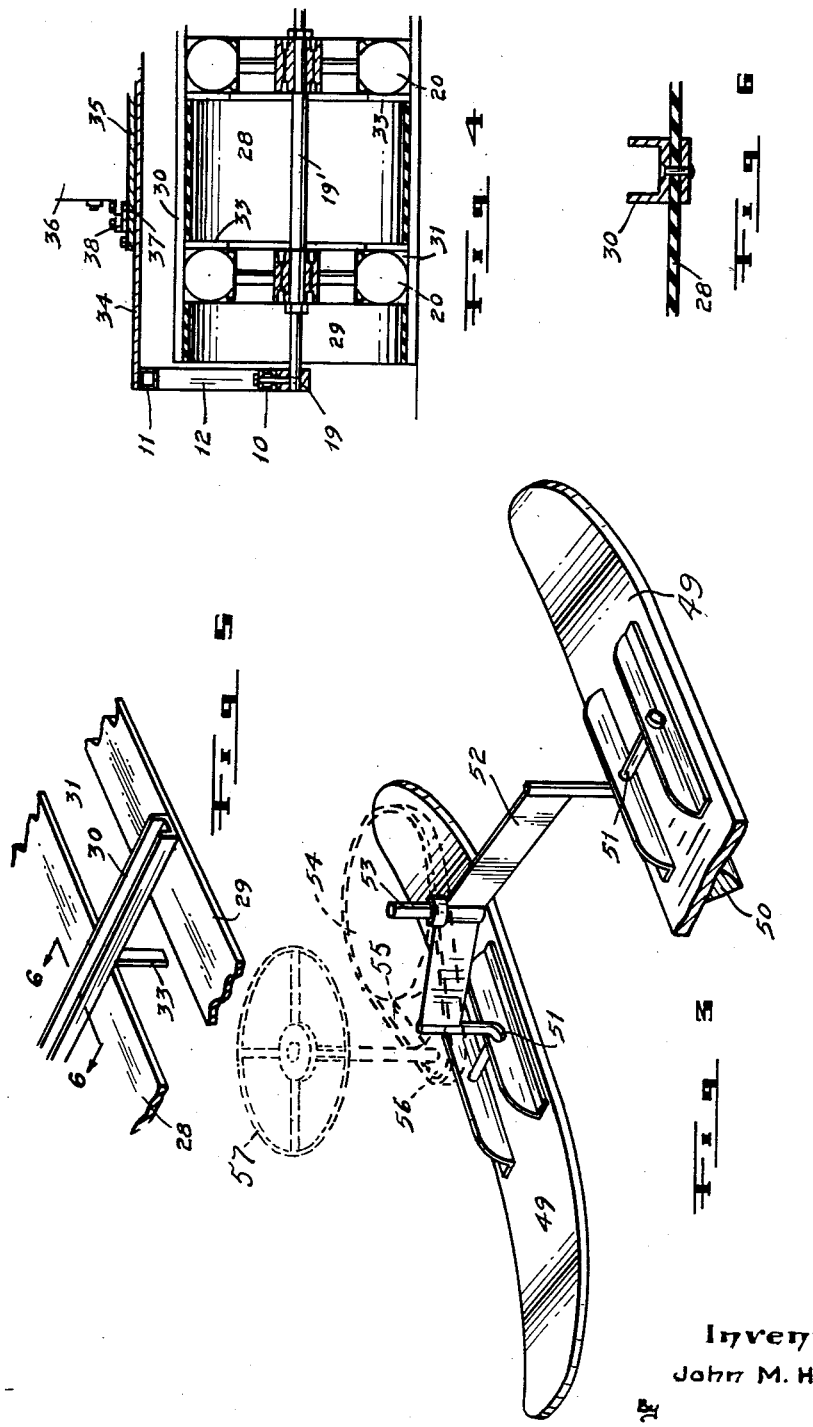

Dec. 5, 1961 J. M. HOWES 3,011,576
ENDLESS TREAD CONSTRUCTION FOR A SNOWMOBILE
Filed Sept. 24, 1958 4 Sheets-Sheet 4

Inventor
John M. Howes
By
Walter C. Bragg
AGENT

United States Patent Office 3,011,576
Patented Dec. 5, 1961

3,011,576
ENDLESS TREAD CONSTRUCTION FOR A SNOWMOBILE
John M. Howes, Kenora, Ontario, Canada
(18800 Lyndale Ave. S., Lakeville, Minn.)
Filed Sept. 24, 1958, Ser. No. 762,998
3 Claims. (Cl. 180—5)

The use of "snowmobiles" for winter transportation is well known. Such machines may be equipped with skis and power driven propellers for fast travel, or with power driven endless treads for relatively slow hauling work. The latter machines usually are provided with chain-like treads at each side thereof which are separately driven, and in turning corners one tread is driven faster than the other. Such transmissions are expensive while the machines are heavy and costly to operate.

Some "snowmobiles" have a drive to a central single endless tread but as the tread is usually flat on the ground considerable power is required for operation, especially in turning corners as so much friction must be overcome. They also have a tendency to tip over in turning corners fast as such a central tread does not present a very wide support.

It is a well known fact that chain links cannot be used at speeds of over eight hundred feet per minute as the high friction causes them to wear out fast. Accordingly, they cannot be used as endless treads for fast moving "snowmobiles." In logging country, paths of very narrow width are cut through the bush for snaking logs out and muskeg is quite common. The above mentioned endless tread machines are usually too wide for such paths while their weight cause them to bog down in the muskeg, and their machinery is often broken in striking rocks or stumps, and repairs are difficult to maintain.

The principal object of the present invention is to provide a tractor "snowmobile" of relatively light construction which will haul loads up to five tons in such logging country, while at the same time can attain speeds up to thirty miles and hour, thus providing a snow vehicle of a class between the fast propeller type and the relatively slow endless tread drive.

Further objects of the invention are to construct the "snowmobile" with an endless belting tread having wide support characteristics to prevent tipping when turning corners, said belting being driven by a light but economical and powerful transmission to reduce the cost of manufacture, while at the same time a relatively narrow machine is produced for negotiating logging paths.

Still further objects of the invention are to provide a narrow machine for a minimum of wind resistance at high speed, the belting tread having a powerful grip on snow, ice, or ground, to haul heavy loads and also provide a relatively large supporting area to prevent sinking in soft terrain, a light enough machine to easily ride up and over rocks and stumps without breakage, and also such that the front ski supported frame thereof can be easily and quickly released from a rear endless tread supported power frame for simplicity and compact loading into an aeroplane for transport where required.

Figure 2:
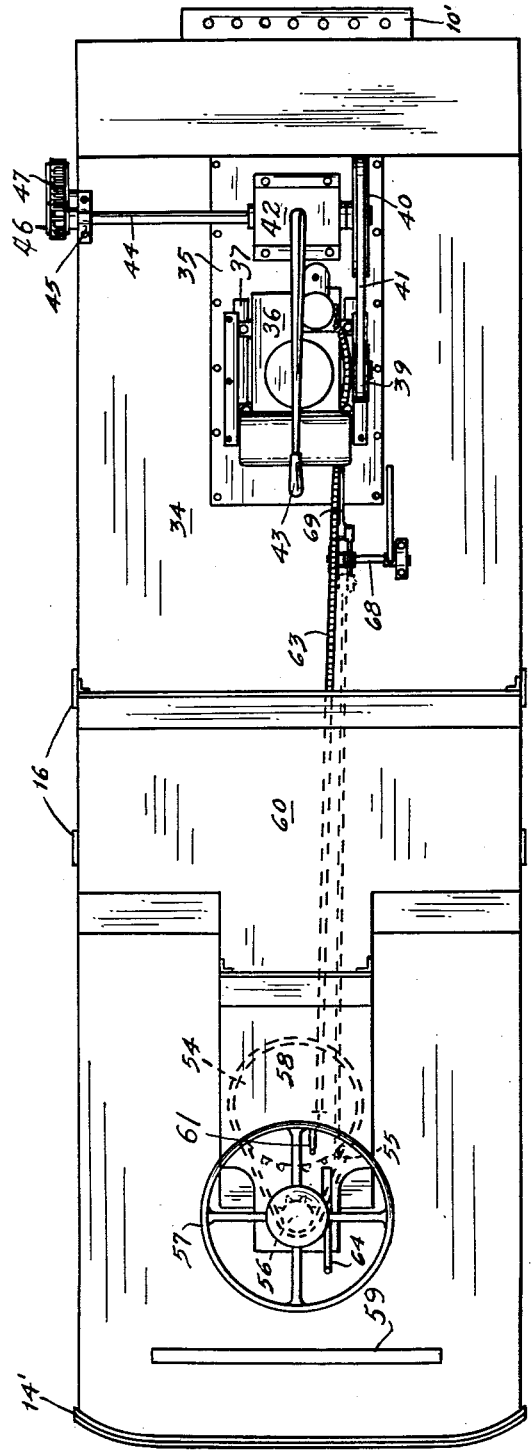
Figure 5:
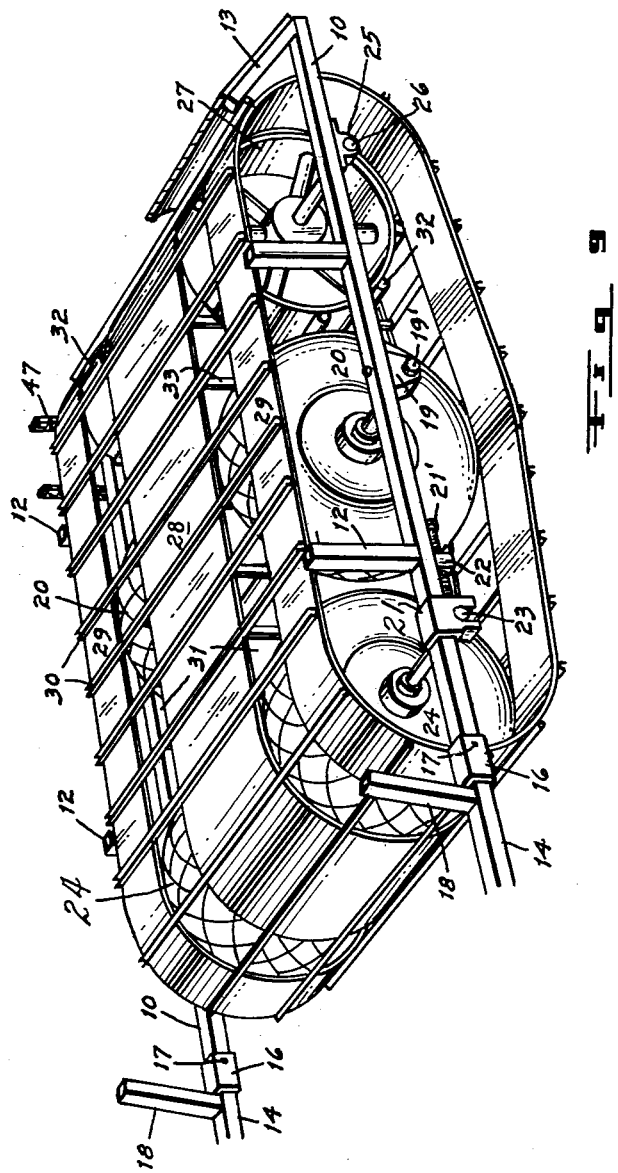

With the above important, and other minor objects in view, which will become more apparent as the description proceeds, the invention consists essentially in the design, arrangement and construction of the various parts hereinafter more particularly described, reference being had to the accompanying drawings in which:

FIGURE 1 is a side view of the "snowmobile."
FIGURE 2 is a plan view thereof.
FIGURE 3 is a perspective view of the front steering skis, part of one ski being broken away to expose construction.
FIGURE 4 is a partial vertical section taken on the line 4—4, FIGURE 1.
FIGURE 5 is an enlarged perspective view showing the construction of the belting tread.
FIGURE 6 is an enlarged vertical section taken on the line 6—6, FIGURE 5.
FIGURE 7 is a perspective view showing the method of sliding the motor on its mount.
FIGURE 8 is an enlarged horizontal section taken on the line 8—8, FIGURE 1.
FIGURE 9 is an enlarged perspective view of the endless tread and associated framework parts.

In the drawings like characters of reference indicate corresponding parts in the several figures.

The framework for the complete "snowmobile" is formed in the present instance from square tubing which is extremely strong, light, and of a standardized size therealong. On the rear or power part of the machine, this framework presents a horizontal U-shaped frame 10 having a drawbar 10' at the rear thereof, and it supports an upper horizontal U-shaped frame 11 through a pair of vertical standards 12 and a rear sloping standard 13 on each side thereof. The open ends of the above frames project ahead.

On the front part of the machine, the framework presents a U-shaped horizontal frame 14 at the same level as the frame 10, its closed front end carrying a bumper 14' while the opposite open ends project rearwardly. These latter open ends are each welded, as at 15 (see FIGURE 8), to a slightly larger telescoped connection tube 16. These connection tubes are adapted to slide over the front ends of the frame 10 to be secured thereto by individual bolts 17 thereacross. A leg 18 projects upwardly at a slight rearward angle from each of the open ends of the frame 14, are then turned level with and toward the ends of the frame 11 to which they are secured in the same way by similar connection tubes 16.

Each side of the frame 10 is provided with an under bracket 19 which carries a fixed cross shaft 19' upon which a pair of spaced rubber tired wheels 20 are rotatably mounted. The front open ends of the frame 10 each carry slidable brackets 21 which are adjustable therealong by a long lower bolt 21' which is threaded through a bracket 22 on the under side of the frame 10. The brackets 21 support a fixed cross shaft 23 which also rotatably receives a pair of spaced rubber tired wheels 24 of the same type as those 20. The rear part of the frame 10, on each under side, carries a bearing 25 which rotatably receives a drive shaft 26 on which a pair of spaced sprockets 27 are mounted, the sprockets being aligned with the wheels 20 and 24. An endless belt encircles the said latter wheels, including the sprockets 27 which drive the said belting within the frame 10.

The above belting consists of a wide central rubber belt 28 between the wheels 20 and 24 and two narrow rubber belts 29, one on the outer side of each set of the above wheels. All belts are connected by spaced cross channels 30 therealong (see FIGURE 5) which are riveted thereto (see FIGURE 6). By this arrangement, the wheels and the sprockets travel in the spaces 31 between the belts and on the channels 30 (see FIGURES 4 and 9), the teeth 32 of the sprockets meshing therewith to drive the belting. It will be noted that vertical bars 33 project through the spaces from the channels and contact the inner tire sides of the wheels to keep the belting in place. By operating the long bolts 21' the belting can be tightened to take up stretch.

It will be noted that the brackets 19 space the axle 19' some distance below the frame 10 and below the axle 23 while the sprockets 27 are of smaller diameter than the rubber tired wheels, such that the wheels 20 support the frame 10 and the load thereon in what might be termed a line contact of the belting thereacross thereunder. Actually, the belting at this longitudinal point is in the shape of a flat V so that the deeper the machine sinks in snow or soft earth, the greater the supporting surface presented thereto and of course the greater the grip thereon. On a hard surface the line contact makes easy steering as the friction is reduced to a minimum and on a soft surface the V-shaped belting is always climbing out as the machine moves.

The upper frame 11 is covered by a suitable planking or platform 34 and the central rear part of this platform receives a rectangular-shaped heavy metal plate 35. A motor 36 is lengthwise movably mounted on this plate by runner members 37 at each side thereof being slidable through guides 38 on the plate. A V-belt pulley 39 is operable by the motor and drives a spring loaded variable pitch pulley 40 through a V-belt 41. The pulley 40 operates through a gear box 42, having a control lever 43, to drive a power shaft 44 which has its outer end rotatably mounted in a bearing 45. This end of the power shaft carries a sprocket 46 which, through a chain 47, drives a larger sprocket 48 on the lower drive shaft 26.

From the above it will be seen that, when the motor is operated, it can be moved ahead to tighten the belt 41 and so drive the variable pitch pulley 40, and by operation of the lever 43, reduction gearing in the gear box can be used for strong power torque on the drive shaft 26. When in high gear, the speed of the machine can be increased by moving the motor further ahead. This will further tighten the belt on the variable pitch pulley so that it operates closer around the centre thereof, and the rotation is faster. Obviously, when the motor is moved back, the belt will finally loosen sufficiently to stop driving and so form a release clutch on the drive.

The front frame 14 is centrally supported from a pair of skis 49, best seen in FIGURE 3. The central lower parts of these skis have V-shaped runners 50 and their upper parts are suitably pivoted at 51 to a cross member 52 having a central vertical shaft 53 passing upwardly therefrom. The upper part of this shaft passes through a bearing (not shown) in the frame 14 and is then provided with a sprocket wheel 54 which is operable, through an endless chain 55, from a smaller sprocket 56 on the bottom of a steering wheel 57. When the "snowmobile" is travelling, the skis will slide freely over snow or ice, and in turning, the runners 50 will have a good tracking grip to effect a strong turning leverage on the rear endless belting.

As will be seen from FIGURE 2, the driver sits behind the steering wheel 57 on a central seat 58 which he straddles, his feet on a cross footboard 59. Two passengers can be accommodated slightly therebehind at each end of a rear seat 60. A lever 61 passes down in front of the driver and is connected to a wire 62 which operates in a cable 63 to a carburetor control on the motor to regulate speed thereof. A long lever 64 is pivoted at 65 to the floor and controls a rod 66 to a double crank 67 pivoted on a shaft 68 on the platform. The opposite end of the double crank operates a pitman 69 which is connected to the motor. Accordingly, when the lever 64 is operated, the motor is moved to tighten or release the belt 41 as previously explained. It might be mentioned at this time that the short lever 70 is also connected to the shaft 68 so the motor can be moved from a position at the back.

The "snowmobile" construction is very light in comparison with ordinary endless tread driven machines, and yet is extremely rugged for the type of work required. No differential or other type of double drive is needed and the belt construction easily permits speeds up to thirty miles an hour, without excessive wear or breakage. Snow and mud falls through the belt spacings 31 at the wheels, instead of packing therearound, and so is always self cleaning. It has a strong gripping action in surface contact. Large tread tires of twelve to fifteen pounds pressure can be used and such cushioning gives easy riding. The wheels and drive sprockets, being close together at the centre, give adequate support and powerful propulsion, while the outer belts 29 insure that the machine will not tip over in fast turning. The front skis slide freely over snow and ice and the runners, plus the reduction chain and sprockets in the steering, give positive control in turning corners, and such steering is greatly facilitated by the line contact of the belting which so greatly reduces friction. It can easily be guided through the narrow bush paths and trails hauling heavy loads from the draw bar, and yet it is light enough to lift up and pass easily over stumps and rocks without breakage. By removing the bolts 17, disconnecting the wire 62 and cable 63 from the motor carburetor, and the rod 66 from the double crank 67, the front frame 14 can be withdrawn from the rear frames 10 and 11. This separation is invaluable for storage or shipping, especially when being loaded into limited cargo space on aeroplanes.

While I have shown the lever 43 directly over the gear box, it will be appreciated that well known suitable linkage could easily be installed for operation of such gear change from the driver's seat.

What I claim as my invention is:

1. An endless tread construction for a "snowmobile," comprising: front and rear U-shaped frames; three spaced cross shafts mounted on said rear frame; two ground wheels mounted on each of the front and the central of said shafts, in spaced relation therealong, and with the wheels of said central and said front shafts trailing each other; a pair of spaced sprockets mounted on the rear of said shafts, each sprocket aligned with a pair of said trailing wheels; a belting encircling said wheels and said sprockets, comprising: a central endless belt enclosing the space between said trailing wheels and said sprockets, a pair of further endless belts, each at one of the outer sides of said trailing wheels and said aligned sprockets; cross irons connecting all said belts thereacross, in spaced relation therealong; the wheels of said central shaft positioned at a lower elevation than the wheels of said front shaft and said sprockets to form, with said cross irons, a line ground support under and across said endless tread; said cross irons forming a track in the spacing between said belts for said wheels to run over, and also meshing with the teeth of said sprockets at said spacing; bars supported by and projecting inwardly from said cross irons, at the belt spacing, for contact with the sides of said wheels to hold said belting in position; means for driving said rear shaft; a pair of skis supporting said front frame; manually operable means for turning said skis to steer said endless tread; and the ends of said frames releasably telescoped together for separation into separate storable units.

2. An endless tread construction, comprising: a rectangular-shaped open framework; three longitudinally spaced cross shafts mounted on said framework; two ground wheels mounted on each of the front and the central of said shafts, in spaced relation therealong, and with the wheels of said central shaft trailing the wheels of the front shaft; a pair of spaced sprockets mounted on the rear of said shafts, each sprocket being aligned with a pair of said trailing wheels; a belting encircling said wheels and said sprockets comprising: a central belt enclosing the space between said trailing wheels and said sprockets; a pair of further belts, each spaced from said central belt and each on one of the outer sides of said trailing wheels and said sprockets; cross irons connecting all said belts in spaced relation therealong; inwardly projecting bars on said cross irons and disposed in the spacing between the belts, contacting the sides of said wheels, in the rotation of said belting, to position same; said cross irons forming a track at said spacing between the belts for said wheels to run over, and also meshing with the teeth of said sprockets at said spacing between the belts; and the lowermost surface of the ground wheels mounted on the central shaft disposed at an elevation below the lowermost surface of the ground wheels mounted on the front shaft, or the lowermost surface of the sprockets mounted on the rear shaft, so that said belts each present a V-shaped ground contact area therealong.

3. An endless tread construction for a "snowmobile," comprising: a framework; three spaced cross shafts mounted on said framework; two ground wheels mounted on each of the front and the central of said shafts, in spaced relation therealong, and with the wheels of said central shaft trailing the wheels of said front shaft; a pair of spaced sprockets mounted on the rear of said shafts, each sprocket aligned with a pair of said trailing wheels; a belting encircling said wheels and said sprockets, comprising: a central endless belt closing the space between said trailing wheels and said aligned sprockets; a pair of further endless belts, each positioned at one of the outer sides of said trailing wheels and aligned sprockets; cross irons projecting over said belts and connecting therewith in spaced relation therealong; said cross irons forming a track at the space between said belts for said wheels to run over, and said cross irons also meshing with the teeth of said sprockets at said spacing; inwardly projecting bars from said cross irons, at the belt spacing, contacting the sides of said wheels in the rotation of said belting, to position same; the lowermost surface of the ground wheels mounted on the central shaft disposed at an elevation below the lowermost surface of the ground wheels mounted on the front shaft, or the lowermost surface of the sprockets mounted on the rear shaft, so that said belts each present a V-shaped ground contact area therealong; means carried by the front of said framework for manually steering said endless tread; and means for driving said rear shaft.

References Cited in the file of this patent
UNITED STATES PATENTS

| | | |
|---|---|---|
| 1,176,053 | Handeland | Mar. 21, 1916 |
| 2,260,344 | Shaw | Oct. 28, 1941 |
| 2,284,075 | Tucker et al. | May 26, 1942 |
| 2,346,351 | Bombardier | Apr. 11, 1944 |
| 2,522,331 | Yocum | Sept. 12, 1950 |
| 2,617,659 | Grenier | Nov. 11, 1952 |
| 2,708,978 | Robitaille | May 24, 1955 |
| 2,749,189 | France et al. | June 5, 1956 |